United States Patent
Stiers et al.

(10) Patent No.: US 6,642,473 B2
(45) Date of Patent: Nov. 4, 2003

(54) HEMMING AND IN-SITU LASER WELDING METHOD AND APPARATUS

(75) Inventors: Daniel J. Stiers, Tecumseh (CA); James T. Williamson, Urbana, OH (US)

(73) Assignee: Unova IP Corp., Woodland Hills, CA (US)

( * ) Notice: Subject to any disclaimer, the term of this patent is extended or adjusted under 35 U.S.C. 154(b) by 11 days.

(21) Appl. No.: 10/094,480

(22) Filed: Mar. 8, 2002

(65) Prior Publication Data

US 2002/0125229 A1 Sep. 12, 2002

Related U.S. Application Data

(60) Provisional application No. 60/275,165, filed on Mar. 12, 2001.

(51) Int. Cl.$^7$ .............................................. B23K 26/20
(52) U.S. Cl. ............................. 219/121.63; 219/121.64
(58) Field of Search ......................... 219/121.6, 121.63, 219/121.64, 121.82, 121.85; 228/135, 136, 137, 212, 213, 44.3

(56) References Cited

U.S. PATENT DOCUMENTS

| 4,654,505 | A | * | 3/1987 | Sciaky et al. |
| 5,053,601 | A | * | 10/1991 | Landtwing et al. |
| 5,616,261 | A | | 4/1997 | Forrest |
| 5,897,796 | A | | 4/1999 | Forrest |
| 6,344,626 | B1 | | 2/2002 | Busuttil |

* cited by examiner

*Primary Examiner*—Samuel M. Heinrich
(74) *Attorney, Agent, or Firm*—Reising, Ethington, Barnes, Kisselle, P.C.

(57) ABSTRACT

A hemming and in-situ laser welding method and apparatus for hemming peripheral flanges of an outer steel panel over peripheral edges of an inner steel panel and laser welding the resulting hemmed joints. A lower die supports an outer metal panel in a position to be hemmed over an edge of an inner panel. An upper die is mounted on a movable support for reciprocal motion and hems the outer panel by folding a flange of the outer panel over onto an edge region of the inner panel when the upper die moves from a raised position to a down position. A laser unit welds the flange of the outer panel to the edge region of the inner panel with the upper die in its down position holding the two panels together.

17 Claims, 3 Drawing Sheets

HEMMING AND IN-SITU LASER WELDING METHOD AND APPARATUS

REFERENCE TO RELATED APPLICATION

This application claims priority of provisional application, Ser. No. 60/275,165, filed Mar. 12, 2001.

FIELD OF THE INVENTION

This invention relates generally to a method and apparatus for hemming a peripheral flange of an outer steel panel over a peripheral edge of an inner steel panel then laser welding the resulting hemmed joint.

BACKGROUND OF THE INVENTION

Hemmed joints are well known in the automobile industry and, among other things, are used to join together inner and outer metal panels of doors and other closure members of automotive vehicles. Resulting hem joints each generally include a flange of metal of one panel being folded over onto an edge of another panel. Typically, in automotive vehicle construction, a peripheral flange or outer edge region of an outer panel is folded over and onto an outer edge region of an inner panel. The resulting hemmed joint provides a finished edge and a mechanical connection between the two panels that adds strength and rigidity to the member.

Tighter tolerance requirements in the automobile industry have made the fit and finish of door and other closure members on an automobile body increasingly important. For example, hinges that attach a door to an automobile body are physically attached to an inner door panel of the door. At the same time, the fit of the door in the automobile body is judged by the alignment of the outer panel relative to a door opening that the door must fit in when closed. Unfortunately, any misalignment between the outer edge of the door and the inner edge of the door opening is readily apparent. To achieve the desired alignment it's not enough that the inner and outer panels be dimensioned to fit exactly as intended in the door opening. The inner and outer panels must also be accurately aligned relative to each other before they're hemmed together and must maintain that alignment during and after hemming. After hemming, the hemmed joint around the periphery of the door will not allow the panels to completely separate from one another, but it's still possible for the inner panel to shift relative to the outer panel. This is because the hemmed joint between the two panels is, in effect, only a slip joint.

To prevent slippage of the inner and outer panels relative to one another, the industry has focused on achieving what's commonly referred to as "total panel lockup". Total panel lockup is a condition achieved where, by hemming two panels together, the panels are effectively prevented from moving relative to one another. One known method for achieving this is to provide induction-cured adhesive in the hem joint. The adhesive is then cured in an oven or some other form of treatment chamber immediately after the hem is formed. However, physically moving an assembled door to an oven or other treatment chamber for adhesive curing can cause the panels to slip relative to one another. Using an instant-setting adhesive can solve this problem. An instant-setting adhesive will lock the panels together as soon as they contact one another. However, the use of such an adhesive would make it impossible, as is often necessary, to shift the two panels into their desired relative position after they've come into contact with one another.

It would, therefore, be desirable to achieve total panel lockup as quickly as possible after, but not before, a hemmed joint has been made. An example of a system that achieves total panel lockup after hemming is disclosed in U.S. Pat. No. 5,897,796 issued Apr. 27, 1999 to Forrest which disclosure is incorporated herein by reference. Forrest discloses a hemming and in-situ laser welding apparatus that includes a lower die shaped to support an outer metal panel in a position to be hemmed over outer edges of an inner metal panel. An upper die is mounted on a movable support for reciprocal motion between a raised position remote from the lower die and a down position adjacent the lower die. The upper die hems the outer panel by folding a peripheral flange of the outer panel over onto a peripheral edge region of the inner panel when the upper die moves into the down position. An inner panel hold-down and locating mechanism positions and holds together the two panels and establishes a stable condition for hemming. After the upper die has moved upward out of its down position, a plurality of laser units move in to weld the peripheral flange of the outer panel to the peripheral edge region of the inner panel. The Forrest in-situ welding system must pause, therefore, for the time it takes the upper die to move a sufficient distance upward from its down position.

It's also known in the art to use spot welding to secure hemmed joints. However, spot welds typically require that the Class A surface of the outer panel be finished following spot welding. Finishing is necessary to obliterate distortions that spot welding causes on the outer surfaces of welded panels where spot welding electrodes are positioned during spot welding. In addition, metal panels can lose their relative orientation in the process of being transported from a hemming machine to a spot welding machine.

It's also known in the art to laser weld a hemmed joint after removing the hemmed joint from a hemming press. Advantages of laser welding over conventional resistance welding include lower distortion in the welded panels, smaller heat effective zones, improved mechanical and structural performance, faster processing speeds, and elimination of the need to gain access to the weld site on a workpiece from both sides of the workpiece. To prevent separation of the panels that would preclude an effective weld, laser welding systems are also known to include welding clamps that hold together panels to be welded. Robots are also known to be used in laser welding operations to position and aim a laser emitter and/or laser director mirrors.

Also known in the art is the formation of conduction welds by heating the surface of a workpiece with a laser beam until the surface melts. According to this process, after the surface melts, heat conduction into the material melts a zone beneath a projection pattern of the laser beam. This zone is roughly hemispherical because heat loss is greater at the edge of the laser projection pattern than at its center. Consequently, so long as lasing is not allowed to continue long enough to start vaporizing the surface metal, conduction welds produce weld nuggets that aren't very deep. As shown in FIG. 1, a properly formed conduction weld 60 has a weld nugget 66 with a cross section that's wider than it is deep. While it's possible to lase the surface of an upper metal panel long enough to form a large melt pool in the panels to be welded, the practical limit of penetration depth into the panels is about 1 mm. YAG lasers are most commonly used to produce such conduction welds although $CO_2$ lasers are also known to be used.

Also shown in FIG. 1 is what's known in the art as a keyhole weld 68 which forms when lasing is continued long enough to cause surface metal vaporization to occur during the formation of a conduction weld. The vaporized metal generates a channel that penetrates more deeply into a workpiece, creating fusion zones and therefore a weld nugget 70 that's much deeper than it is wide. Keyhole welds are therefore undesirably deeper, rougher and more variable than conduction welds. The vaporized metal resulting from keyhole welds also generates more contamination than is found in conduction welds. Keyhole welds are what typically result from the use of YAG lasers.

Another type of laser that can be used in welding is the diode laser. Diode lasers include nearly microscopic chips of Gallium Arsenide or other exotic semiconductors to generate coherent light.

It would be desirable to provide a hemming and in-situ laser welding method and apparatus that welds a flange of an outer panel to an edge region of an inner panel immediately after hemming the panels together, and while an upper die of the apparatus is still in its down position after hemming.

BRIEF SUMMARY OF THE INVENTION

The invention is a hemming and in-situ laser welding apparatus for hemming peripheral flanges of an outer steel panel over peripheral edges of an inner steel panel and laser welding the resulting hemmed joints. The apparatus includes a lower die configured to support at least a portion of an outer metal panel in a position to be hemmed over an edge region of an inner panel. An upper die is mounted on a movable support for reciprocal motion between a raised position remote from the lower die and a down position adjacent the lower die. The upper die is configured and positioned to hem the outer panel by folding a flange of the outer panel over onto the edge region of the inner panel when the upper die moves into the down position. A laser unit is positionable to weld an outer edge of the flange of the outer panel to an upper surface of the inner panel while the upper die is still in its down position holding the two panels together.

The invention also includes a method for hemming peripheral flanges of an outer steel panel over peripheral edges of an inner steel panel and laser welding the resulting hemmed joints. According to this method, inner and outer panels are provided between upper and lower dies of a hemming apparatus. The apparatus then forms a hemmed joint by folding a flange of the outer panel over onto an edge region of the inner panel by moving the upper and lower dies together. An outer edge of the outer panel flange is then laser welded to an upper surface of the inner panel after moving the upper and lower dies together and before moving the upper and lower dies apart. The upper and lower dies are then moved apart to allow for removal of the joined panels.

Objects, features and advantages of this invention include providing a method and apparatus for total panel lockup of an assembly that comprises a hemmed joint, providing a method and apparatus that achieves total panel lockup in a desired aligned relationship or relative position and does so immediately after hemming and before the panels have had an opportunity to shift out of their aligned relationship, allowing for and providing laser welding immediately after the panels have been hemmed, preventing spring-back of the folded-over flange, i.e., preventing the folded-over flange from raising out of contact with the edge region of the inner panel—a condition that would otherwise prevent a satisfactory laser weld from forming, and to provide a method and apparatus for welding a hemmed joint of two aluminum panels in which the aluminum does not need to be cleaned before the welding operation is performed.

These and other objects of the invention will become apparent from the following detailed description in which the reference numerals used throughout the description correspond to numerals shown on the drawing figures.

BRIEF DESCRIPTION OF THE SEVERAL VIEWS OF THE DRAWINGS

These and other objects, features and advantages of this invention will be apparent from the following detailed description of the preferred embodiment(s) and best mode, appended claims, and accompanying drawings in which:

DETAILED DESCRIPTION OF INVENTION EMBODIMENT(S)

Figure 1:
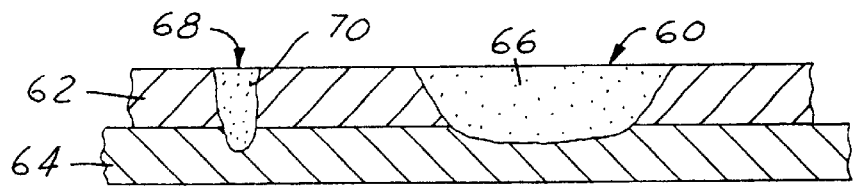
FIG. 1 is a cross-sectional side view of two metal panels welded together by a keyhole weld and a conduction weld.

An apparatus 10 constructed to hem peripheral flanges of an outer steel panel 28 over peripheral edges of an inner steel panel 30 and to laser weld the resulting hemmed joints is shown in the drawings. Broadly described, the apparatus 10 includes a lower die 24 or "die post" that supports inner and outer metal panels 30, 28. The lower die 24 supports the outer metal panel 28 in a position to be hemmed over a peripheral edge region 31 of the inner panel 30. An upper die 32 or "die steel" is mounted on a movable support for reciprocal motion between a raised position remote from the lower die 24 and a down position adjacent the lower die 24. The upper die 32 hems the outer panel 28 by further folding a folded-over edge or flange 29 of the outer panel 28 onto the edge region 31 of the inner panel 30 when the upper die 32 moves into the down position. The apparatus 10 also includes a laser unit 36 that's positionable to weld an outer edge of the flange 29 of the outer panel 28 to an upper surface 44 of the inner panel 30 with the upper die 32 still in its down position holding the two panels together. This is done to achieve total panel lockup in a desired aligned relationship or relative position immediately after hemming and before the panels have had an opportunity to shift out of their aligned relationship.

The upper die includes a planar engagement surface that engages the flange 29 of the outer panel 28. The planar engagement surface has a continuous linear outer edge 43. The movable support aligns the outer edge 43 of the engagement surface in a disposition generally parallel to and adjacent the outer edge 42 of the flange 29 in the down position to provide uniform compression along the resulting hemmed joint and to avoid distortion on an outer class A surface of the outer panel 28.

Figure 2:
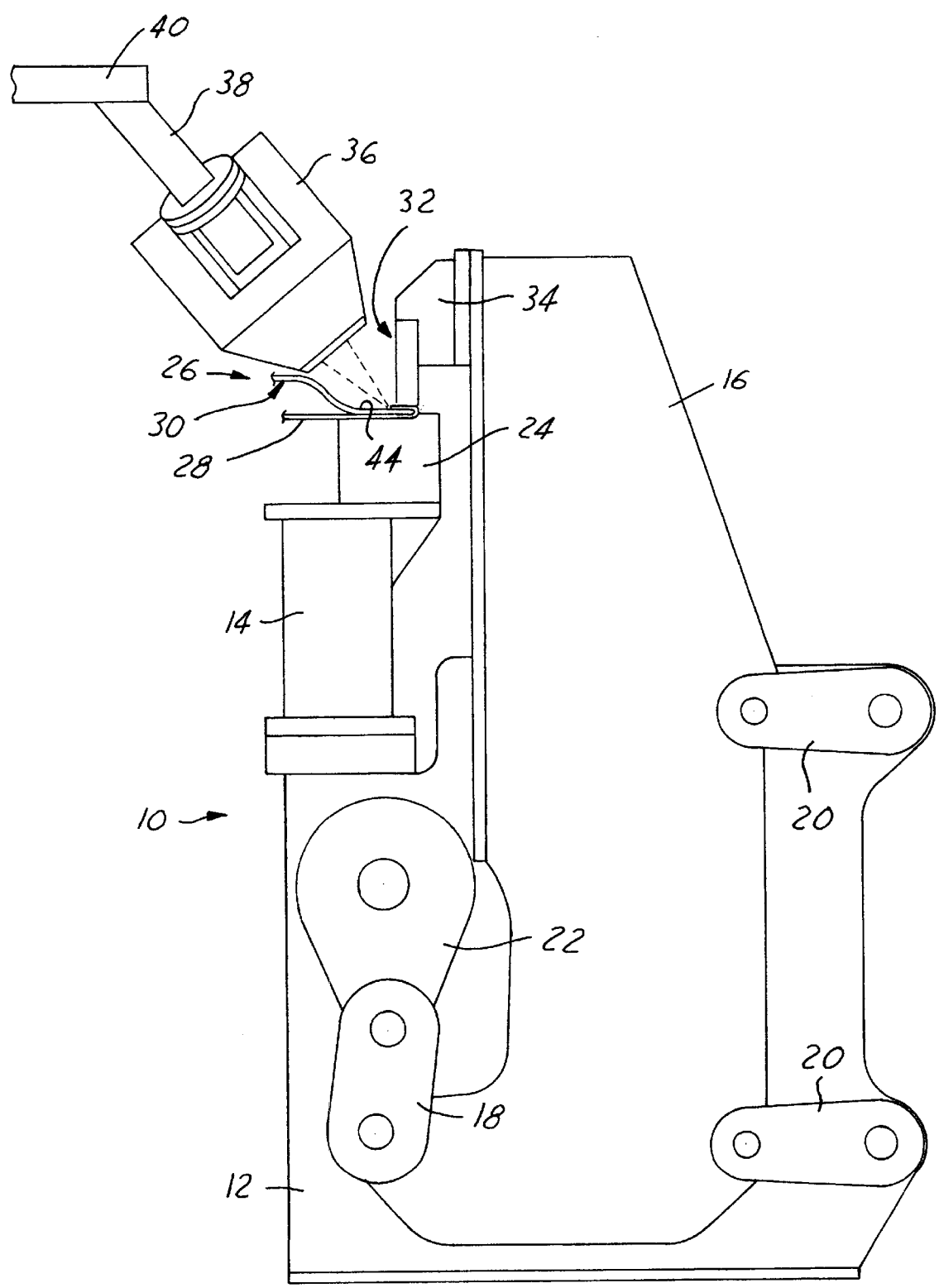
FIG. 2 is a schematic front view of a hemming and in-situ laser welding apparatus constructed according to the invention.

As shown in FIG. 2, the hemming and in-situ welding apparatus 10 comprises a base 12, an anvil support 14, and a movable support 16 connected to the base 12 by linkage members 18, 20. Linkage member 18 is driven by a crank arm 22 that's driven, in turn, by a prime mover (not shown).

The lower die 24 is mounted on the anvil support 14 and supports a workpiece 26 comprising the outer panel 28 and the inner panel 30. The upper die 32 is mounted on a die steel holder 34 that's mounted to the movable support 16. In FIG. 2, the upper die 32 is shown in the down position holding the workpiece 26 down against the die post. The upper die 32 may be raised to release the workpiece 26 and to allow the introduction of another workpiece (not shown).

As is also shown in FIG. 2, the laser unit 36 is mounted on a bracket 38 that's attached to an inner panel hold-down and locating mechanism 40. The inner panel hold-down and locating mechanism 40 is conventionally used to correctly position, hold-down and stabilize the inner panel 30 relative to the outer panel 28 so that the two panels can be hemmed together in their proper orientation and relationship. The workpiece engaging members of the inner panel hold-down and locating mechanism 40 are not shown, but such members are conventional and well known in the art. The laser unit 36 directs a laser beam onto a generally linear interface 41 between the panels 28, 30 at the hem joint, i.e., at the interface 41 between an outer edge 42 of the flange 29 of the outer panel 28 and an upper surface 44 of the inner panel 30, as is more fully explained below.

Figure 3:
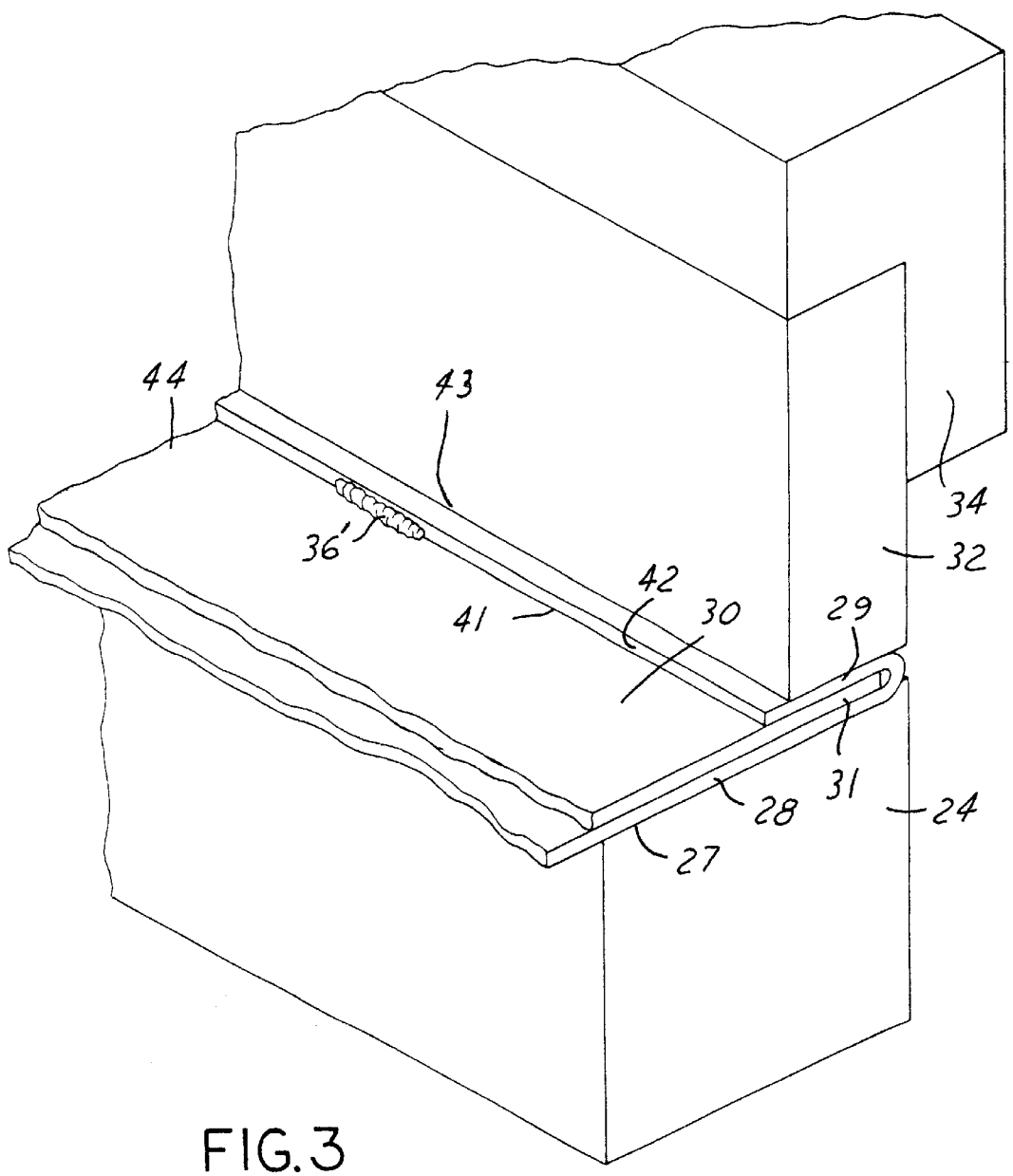
FIG. 3 is schematic detail view of two panels after having been hemmed together by the hemming and in-situ laser welding apparatus of FIG. 1.

As shown in FIG. 3 the workpiece 26 is supported on the lower die 24 and the upper die 32 is supported on the upper die steel holder 34. As is also shown in FIG. 3, the edge region 31 of the inner panel 30 is shown captured by the folded over flange 29 of the outer panel 28. The bottom surface 27 of the outer panel 28 will comprise a Class A surface of the finished panel member or workpiece 26. A weld 36 has been formed between the folded over flange 29 of the outer panel 28 and the inner panel 30 where the folded over flange 29 of the outer panel 28 has been forced against the inner panel 30 by the hem steel 32.

Figure 4:
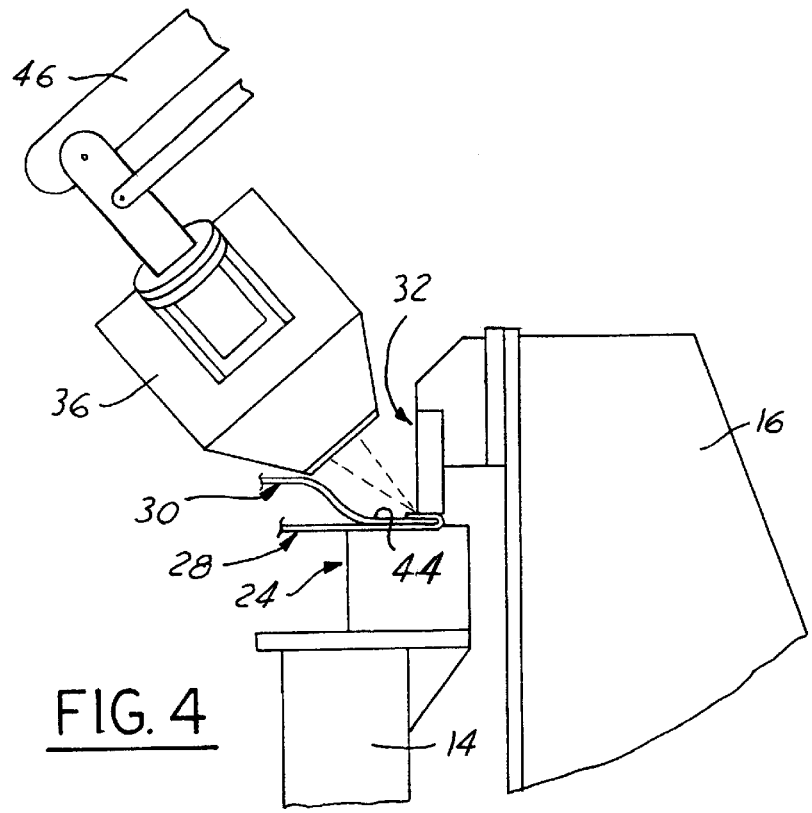
FIG. 4 is a schematic detail view of an alternative hemming and in-situ laser welding apparatus embodiment showing a laser source mounted on the end of a robot arm.

As shown in FIG. 4, the laser unit 36 may be mounted on a robot arm 46 instead of the inner panel hold down and locating mechanism 40. In this alternative embodiment of the hemming and in-situ welding apparatus, the robot arm 46 is able to position the laser unit 36 relative to the workpiece 26 so that one or more welds can be produced along the edge 42 of the outer panel 28 where it is folded over the edge region 31 of the inner panel 30. The robot arm 46 has the ability to move a single laser unit to one or more positions along the hemmed workpiece 26, thus increasing the productivity of the single laser.

To avoid distorting the class A surface of the outer panel 28, the laser unit 36 forms, through conduction welding, a weld nugget 36' that's wider than it is deep. The laser unit 36 used to form the conduction weld nugget includes a diode laser having approximately four kilowatts of power. The beam pattern from a diode laser is characteristically large and spread out rather than being sharp and highly focused. It's for this reason that a diode laser beam has been found to be suited to welding a hemmed joint. Because it employs a diode laser, the laser unit 36 produces a beam shape that's sufficiently spread out to preclude distortion of the class A surface of the outer panel 28. Where the panels are aluminum or steel, a diode laser has been shown to form a conduction weld that doesn't telegraph through to the Class A surface of the outer panel 28.

Figure 5:
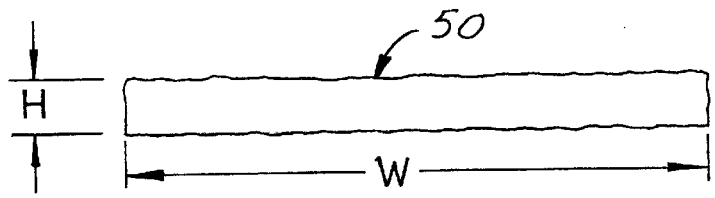
FIG. 5 is a top view of a laser beam projection pattern formed by a diode laser of the hemming and in-situ laser welding apparatus of either FIG. 1 or FIG. 2.

As shown in FIG. 5, the laser unit 36 produces a beam that, in addition to being relatively large and "spread-out", is laterally elongated and is generally rectangular in cross section. The laser unit 36 is positioned to project this generally rectangular beam onto the generally linear hem joint interface 41 between the inner panel 30 and the edge of the flange 29 of the outer panel 28. In the present embodiment, the projection pattern has a height H to width W ratio between 1:10 and 1:25. However, in other embodiments, the projection pattern may be of any suitable height to width ratio.

Figure 6:
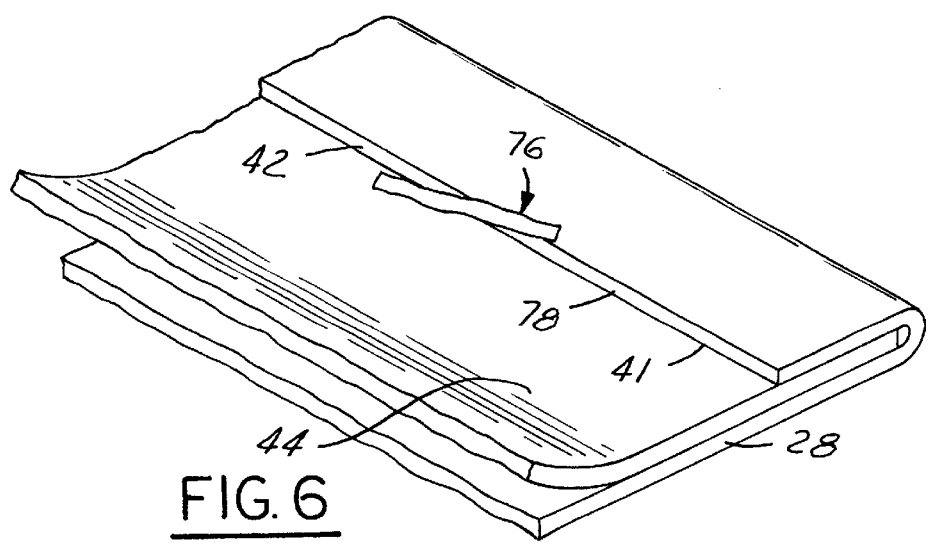
FIG. 6 is a partial perspective view of a diode laser projection pattern projected onto a hemmed joint.

FIG. 6 shows one method of projecting the beam from a diode laser onto a hemmed joint. As shown in FIG. 6, the laser unit 36 projects the beam in such a way that it produces a resultant laterally elongated projection pattern or "area of laser beam incidence" that's skewed relative to and crosses the interface 41. The skewed orientation of the projection pattern insures that the resulting weld will be formed across the interface 41 and will involve both panels. The skewed orientation obviates the need to use a probe or vision equipment to precisely align the beam along the interface 41.

In practice, the peripheral flanges of an outer steel panel can be hemmed over peripheral edges of an inner steel panel using the above described apparatus by first providing inner and outer metal panels 30, 28 between the upper and lower dies 32, 24 of the hemming apparatus 10 and supporting the panels on the lower die 24.

A hemmed joint is then formed by folding the flange 29 of the outer panel 28 over onto the edge region 31 of the inner panel 30 by moving the upper and lower dies together. The upper die 32 is moved downward from a raised position remote from the lower die 24 to a down position adjacent the lower die 24. When the upper die 32 reaches the down position the outer edge 43 of the engagement surface of the upper die 32 is aligned in a disposition generally parallel to and adjacent the outer edge 42 of the flange 29 to preclude surface discontinuities by providing even pressure over the flange during hemming. Before forming the hemmed joint, the flange 29 of the outer panel 28 may be pre-hemmed by bending the flange 29 to form an acute included angle relative the rest of the panel.

After the upper die 32 has been moved to its down position, the laser unit 36 welds an outer edge 42 of the outer panel flange 29 to the upper surface 44 of the inner panel 30. This occurs while the upper and lower dies 32, 24 continue to hold the panels 28, 30 together following hemming. Once the laser welding operation is complete, the upper and lower dies 32, 24 are moved apart to allow for removal of the joined panels 28, 30.

When aluminum panels are conduction welded according to the above method, and when the laser unit comprises a diode laser, its unnecessary to first remove the waxy coating that typically coats the surfaces of aluminum panels used in automobile manufacturing. Aluminum panels are generally provided with such a waxy coating to allow the aluminum to be drawn, and to prevent the sheets from adhering to one another when they are stacked on top of each other. This waxy coating must normally be removed before welding to prevent the waxy coating from inhibiting the formation of a satisfactory weld. The reason that the waxy coating need not be removed for conduction welding by a diode laser is that the diode laser beam heats the aluminum panels slowly enough to allow the coating to vaporize in a non-violent manner, but rapidly enough so that the Class A surface of the workpiece 26 is not distorted by the heat of the weld.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

We claim:

1. A hemming and in-situ laser welding apparatus comprising:
   a lower die configured to support at least a portion of an outer metal panel in a position to be hemmed over an edge region of an inner panel;
   an upper die mounted on a movable support for reciprocal motion between a raised position remote from the lower die and a down position adjacent the lower die and configured and positioned to hem the outer panel by folding a flange of the outer panel over onto the edge region of the inner panel when the upper die moves into the down position; and
   a laser unit positionable to weld an outer edge of the flange of the outer panel to an upper surface of the inner panel with the upper die in its down position holding the two panels together.

2. A hemming and in-situ laser welding apparatus as defined in claim 1 in which:
   the upper die includes a planar engagement surface configured to engage the flange of the outer panel, the planar engagement surface having a continuous linear outer edge; and
   the movable support is configured to align the outer edge of the engagement surface in a disposition generally parallel to and adjacent the outer edge of the flange in the down position.

3. A hemming and in-situ laser welding apparatus as defined in claim 1 in which the laser unit is configured to form a conduction weld.

4. A hemming and in-situ laser welding apparatus as defined in claim 1 in which the laser unit is configured to produce a beam shape that is spread widely enough to preclude distortion of the class A surface of the outer panel.

5. A hemming and in-situ laser welding apparatus as defined in claim 1 in which the laser unit is configured to produce a weld nugget that's wider than it is deep.

6. A hemming and in-situ laser welding apparatus as defined in claim 1 in which the laser unit is:
   configured to produce a laterally elongated beam; and
   positioned to project the laterally elongated beam onto an interface between the inner panel and an edge of the flange of the outer panel such that a resultant laterally elongated projection pattern is skewed relative to and crosses the interface.

7. A hemming and in-situ laser welding apparatus as defined in claim 5 in which the laser unit is configured and positioned to form a projection pattern having a height to width ratio between 1:10 and 1:25.

8. A hemming and in-situ laser welding apparatus as defined in claim 1 in which the laser unit comprises a diode laser.

9. A hemming and in-situ laser welding apparatus as defined in claim 1 and further including an inner panel hold-down and locating mechanism configured to properly position and hold together the two panels.

10. A hemming and in-situ laser welding apparatus as defined in claim 8 in which the laser unit is attached to the inner panel hold-down and locating mechanism.

11. A hemming and in-situ laser welding apparatus as defined in claim 1 in which the laser unit is mounted on a robot arm configured to position the laser unit relative to the panels.

12. A method for hemming peripheral flanges of an outer steel panel over peripheral edges of an inner steel panel and laser welding the resulting hemmed joints, the method including the steps of:
   providing inner and outer panels between upper and lower dies of a hemming apparatus;
   forming a hemmed joint by folding a flange of the outer panel over onto an edge region of the inner panel by moving the upper and lower dies together;
   laser welding an outer edge of the outer panel flange to an upper surface of the inner panel after moving the upper and lower dies together and before moving the upper and lower dies apart; and
   moving the upper and lower dies apart to allow for removal of the joined panels.

13. The method of claim 12 in which:
   the step of providing inner and outer panels between upper and lower dies of a hemming apparatus includes supporting the inner and outer panels on the lower die; and
   the step of moving the upper and lower dies together includes moving the upper die from a raised position remote from the lower die to a down position adjacent the lower die.

14. The method of claim 12 in which the step of providing inner and outer panels between upper and lower dies of a hemming apparatus includes pre-hemming the flange of the outer panel by bending the flange to form an acute included angle relative the rest of the panel before the step of forming a hemmed joint.

15. The method of claim 12 in which the step of laser welding the hemmed joint includes laser welding the hemmed joint while the upper and lower dies hold the panels together.

16. The method of claim 12 in which the step of laser welding the hemmed joint includes providing a laser unit positionable to weld the flange of the outer panel to the edge region of the inner panel with the upper die in its down position.

17. The method of claim 12 in which:
   the step of providing inner and outer panels between upper and lower dies of a hemming apparatus includes providing an upper die having a planar engagement surface configured to engage the flange of the outer panel, the planar engagement surface having a continuous linear outer edge; and
   the step of forming a hemmed joint includes aligning the outer edge of the engagement surface in a disposition generally parallel to and adjacent an outer edge of the flange.

* * * * *